(12) United States Patent
Glaser et al.

(10) Patent No.: US 9,712,616 B2
(45) Date of Patent: Jul. 18, 2017

(54) METHOD FOR CALLING UP A MEDIA FILE IN A TELECOMMUNICATION SYSTEM, COMPUTER PROGRAM PRODUCT FOR EXECUTING THE METHOD, AND TELECOMMUNICATION SYSTEM FOR CALLING UP THE MEDIA FILE

(71) Applicant: Unify GmbH & Co. KG, Munich (DE)

(72) Inventors: Martin Glaser, Bergkamen (DE); Claus Rist, Bochum (DE); Bernd Gronostay, Waltrop (DE)

(73) Assignee: Unify GmbH & Co. KG, Munich (DE)

( * ) Notice: Subject to any disclaimer, the term of this patent is extended or adjusted under 35 U.S.C. 154(b) by 80 days.

(21) Appl. No.: 14/703,040

(22) Filed: May 4, 2015

(65) Prior Publication Data

US 2015/0237134 A1    Aug. 20, 2015

Related U.S. Application Data

(63) Continuation of application No. 13/958,940, filed on Aug. 5, 2013, now abandoned.

(30) Foreign Application Priority Data

Aug. 6, 2012 (DE) .................. 10 2012 015 570

(51) Int. Cl.
*G06F 15/16* (2006.01)
*H04L 29/08* (2006.01)
(Continued)

(52) U.S. Cl.
CPC ...... *H04L 67/1095* (2013.01); *H04L 65/1069* (2013.01); *H04L 65/4084* (2013.01);
(Continued)

(58) Field of Classification Search
CPC ..... H04L 67/18; H04W 4/16; H04M 2242/30; H04M 3/42059; H04M 2242/15; H04M 3/42229; H04M 1/72572; H04M 3/42348
(Continued)

(56) References Cited

U.S. PATENT DOCUMENTS 6,529,584 B1   3/2003 Ravago et al.
6,941,575 B2   9/2005 Allen
(Continued)

FOREIGN PATENT DOCUMENTS

WO         9909744       2/1999

*Primary Examiner* — Wing F Chan
*Assistant Examiner* — Joseph Maniwang
(74) *Attorney, Agent, or Firm* — Buchanan Ingersoll & Rooney PC

(57) ABSTRACT

A method for calling up a media file wherein the content of the called up media file is presented unrequested to the user of one of the multiple telecommunication terminals via a connection established with a telecommunication terminal includes provisioning of an interface in the telecommunication control unit such that the media file stored outside a telecommunication system can be accessed via the interface. The establishment of the connection can also include installation of a media assignment target in the telecommunication control unit central to the telecommunication system, selection of the media assignment target by one of the multiple telecommunication terminals and placement of a link to the media file in the telecommunication control unit by means of which the media file is assigned, and call-up of the media file by the telecommunication control unit via the interface using the link placed in the telecommunication control unit.

20 Claims, 5 Drawing Sheets

(51) Int. Cl.
*H04M 3/428* (2006.01)
*H04L 29/06* (2006.01)

(52) U.S. Cl.
CPC .............. *H04L 67/10* (2013.01); *H04L 67/18* (2013.01); *H04M 3/4285* (2013.01)

(58) Field of Classification Search
USPC ........................................................ 709/217
See application file for complete search history.

(56) References Cited

U.S. PATENT DOCUMENTS

| | | |
|---|---|---|
| 7,308,462 B1 | 12/2007 | Clarkson et al. |
| 2002/0126701 A1 | 9/2002 | Requena |
| 2002/0146106 A1 | 10/2002 | Himmel et al. |
| 2002/0184237 A1 | 12/2002 | McFeely |
| 2002/0191775 A1 | 12/2002 | Boies et al. |
| 2003/0043782 A1 | 3/2003 | Laursen et al. |
| 2004/0068458 A1 | 4/2004 | Russo |
| 2008/0152116 A1 | 6/2008 | Sylvain |
| 2009/0168978 A1 | 7/2009 | Laws et al. |
| 2010/0112990 A1* | 5/2010 | Dingler ................... H04L 67/18 455/414.2 |
| 2010/0287587 A1* | 11/2010 | Patten ................ H04N 5/44543 725/39 |
| 2011/0051908 A1* | 3/2011 | Garner ................... G06Q 30/02 379/88.04 |
| 2014/0040426 A1 | 2/2014 | Glaser et al. |

* cited by examiner

| Connection Settings – 21 | Announcements - 23 |||
|---|---|---|---|
| | Change Announcements And Hold Music – 24 |||
| | Announcement – 25   27C |||
| Announcement And Internal Hold Music 22 | No. - 26 | Audio File - 27 | Description - 28 |
| | 26A  1. | Conftone.wav - 27A | Endless – 28A |
| | 26B  2. | Ringtone.wav – 27B | Start/stop – 28B |
| | 26C  3. | http://ansage.com/ansage1 | Link – 28C |
| 27D | 26D  4. | http://companyweb/default.aspx | Link – 28D |
| | 26E  5. | http://www.wdr.de/wdr2.mru  27E | Link – 28E |

METHOD FOR CALLING UP A MEDIA FILE IN A TELECOMMUNICATION SYSTEM, COMPUTER PROGRAM PRODUCT FOR EXECUTING THE METHOD, AND TELECOMMUNICATION SYSTEM FOR CALLING UP THE MEDIA FILE

CROSS-REFERENCE TO RELATED APPLICATION

The present application is a continuation application of U.S. patent application Ser. No. 13/958,940, which claims priority to German Patent Application No. 10 2012 015 570.0, which was filed on Aug. 6, 2012. The entirety of German Patent Application No. 10 2012 015 570.0 is incorporated by reference herein.

FIELD OF INVENTION

The present invention relates to a telecommunication system, non-transitory computer readable medium that is executable by a communication device for implementing a method of calling up a media file, and a method of calling up a media file in a telecommunication system. Embodiments of the telecommunication system may include a telecommunication control unit and multiple telecommunication terminals may be connected to the telecommunication control unit for calling up a media file. Embodiments of the computer program product may be stored on a non-transitory computer readable medium and may have instructions that define a method that is performed by a telecommunications control unit when that device runs the program stored on the computer readable medium.

BACKGROUND OF THE INVENTION

Telecommunication systems today can be in hardware form, as illustrated by the system known as OpenScape Office MX from Siemens Enterprise Communications GmbH & Co. KG, a standalone system in a 19" housing with pre-installed software, which can act as the control unit and connect up to 1,000 telecommunication terminals with each other via networking. Another telecommunication system from the same manufacturer is OpenScape Office LX, a system that can be operated in software form through a Linux server on any platform, whereby up to 1,000 telecommunication terminals can be connected with each other through this system via networking. With these systems it is possible to play an announcement or hold music (e.g., the contents of a media file such as an audio file), to the user of a telecommunication terminal who did not request it. An audio file, in WAV or MP3 format, for example, can be stored locally on the telecommunication system for this purpose. Even in networked systems, the announcement or hold music is stored locally on each networked system, so each telecommunication system must have its own announcement or hold music. The disadvantage to locally storing one or more audio files on the telecommunication system is that, with networked telecommunication systems, each system must have its own separate announcement or hold music, and storing the audio file on the telecommunication system is often a complicated process, so that only an administrator or user with specialized knowledge about the telecommunication system can locally store and/or change the audio file.

We have determined that a new system, device, computer readable medium, and method are needed to permit media files to be more effectively called up for use by a telecommunication system of devices of such a system.

SUMMARY OF THE INVENTION

We provide herein a method for calling up a media file, a computer program product for executing the method, and a telecommunication system for calling up the media file, with which the media file, whose content is presented to a user of the telecommunication system without having been requested, can be placed easily on the telecommunication system and with which such a media file can be accessed easily and flexibly. For example, embodiments of the invention may provide a method, a computer program product for executing the method, and a telecommunication system with which it is possible to play different formats of media files to a user of the telecommunication system, wherein these media files can be stored and accessed easily.

Embodiments of the invented method for calling up a media file in a telecommunication system that includes a telecommunication control unit and multiple telecommunication terminals connected to the telecommunication control unit may include a number of steps. The content of the called-up media file may be presented through a connection established with one of the multiple telecommunication terminals to a user of that telecommunication terminal without being requested. An interface may be provided in the telecommunication control unit such that the media file, which is stored outside of the telecommunication system, can be accessed through the interface. In the telecommunication control unit, a media assignment target selectable from each of the multiple telecommunication terminals is established centrally in the telecommunication system for assigning the media file. The media assignment target is selected through one of the multiple telecommunication terminals, and a link to the media file is placed in the telecommunication control unit, thereby assigning the media file. The media file can be called up by the telecommunication control unit via the interface using the link placed in the telecommunication control unit.

If a user of one of the multiple telecommunication terminals uses a trunk line to reach another user on another telecommunication terminal, all of the telecommunication terminals that are or can be connected to each other via this trunk line and/or a station may be encompassed by an embodiment of the telecommunication system. A trunk line can also simply be called a trunk. In this regard, in addition to the telecommunication control unit and multiple telecommunication terminals connected to it, the telecommunication system can also include one or more trunks.

The content of the media file can include, for example, an announcement, advertising music or both an announcement and advertising music. The media file can be played by means of a Start/Stop function or as an endless loop. In addition to storable files, the media files can also be streams containing information that is available to the users of the telecommunication system in real time or quasi-real time. A media file is hereinafter understood to be any type of media that can be played on a telecommunication terminal for a user of that terminal. Because the content of the media file is presented to the terminal user without being requested, active pre-selection of the media file's content by the terminal user is not necessary. In particular, no user interface (abbreviated as UI), which a terminal user would need in order to select or pre-select the content of the media file, is necessary on the terminal. The choice of media file is instead made fully automatically by the telecommunication control unit, depending on the link to the media file placed in the telecommunication control unit.

The telecommunication terminal can be a wired terminal, such as a desk telephone, or a wireless terminal, such as a Digital Enhanced Cordless Telecommunications (DECT) telephone, mobile telephone, Internet Protocol (IP) telephone, PDA (Personal Digital Assistant), personal computer (PC), or tablet PC, which is wired or wirelessly connected to the telecommunication control unit. The telecommunication terminal can be an SIP (Session Initiation Protocol)/HFA (HiPath Feature Access) or TDM (Time Division Multiplex) terminal. The interface in the telecommunication control unit can be a hardware interface, such as a network interface, e.g., an RJ-45 interface, or a wireless interface, such as a WLAN (Wireless Local Area Network) interface, especially in one of the formats 802.11a to 802.11n. Other interface configurations are also possible. The media assignment target in the telecommunication control unit can be in the form of a graphic user interface, through which the media file can be assigned centrally for the telecommunication system in the telecommunication control unit, for example by choosing the media file from a server on which the media file is placed locally and/or via access to a network such as the Internet.

The media file is stored outside of the telecommunication system, i.e., not locally on the telecommunication system. Because a link to the media file can be placed in the telecommunication control unit by selecting the media assignment target through one of the multiple telecommunication terminals, and the media file can be called up through the telecommunication control unit via the interface using this link, the media assignment target represents a central feed point for announcements and/or hold music, in the form of company information, for example, which the telecommunication terminal user seeks to reach through the telecommunication terminal. In addition, the media assignment target can be accessed through each of the multiple telecommunication terminals for selecting the media file, which can be assigned individually for each of the multiple telecommunication terminals. The telecommunication system is thereby expanded to include a central feed point for external announcements and/or hold music in the form of the media assignment target for placing and calling up the media file. The media assignment target represents, as a feed point, a communication partner for the user of one of the multiple telecommunication terminals, which can be selected by each of these telecommunication terminals and can be used as a "coupling point" for media file content, such as announcement loops, to be played without the request of a telecommunication terminal user. Through the links placed in the media assignment target to one or more media files, connections to media files stored outside of the telecommunication system are made available as individual announcement targets, if the content of the media file is supposed to be presented to a telecommunication terminal user without being requested.

The media file, whose content consists of an announcement or hold music, for example, can be an audio file, video file, audio stream, or video stream. The audio stream can be a live stream from an Internet radio station, for example. However, the media file can also be a video stream in the form of a live stream from an Internet (news or television) station. Alternatively or in addition to the Internet, the media file can come from a local source, such as a server in the company's network that hosts the telecommunication system. In this way, the media file can be an audio stream with company messages or a video stream with company videos.

Another example of the media file is a file stored outside of the telecommunication system, such as the "GoodDay.wav" audio file. In addition to an audio file, a video file, such as a company video and/or advertisement, is also possible. In the case of a call center, the video stream can be a live video from the call center or the call center employee who is supposed to take the call from the telecommunication terminal user that is waiting in a queue. For playing media files in the form of a stream, a stream reader can be used. An application program for a stream reader can be stored on the assigned server on which the media file is stored, outside of the telecommunication system. Alternatively or in addition, the stream reader application program can also be stored on the telecommunication control unit and/or one or more telecommunication terminals. After a connection is established between the telecommunication terminal and the telecommunication control unit, the media file can be presented unrequested to the telecommunication terminal user, wherein no ongoing conversation is necessary between the telecommunication terminal user and another user of a telecommunication terminal in the telecommunication system. If, for example, all lines are busy when a telecommunication terminal user calls a call center, as soon as the connection is established between the user's terminal and the call center, a media file whose content is hold music can be played to the telecommunication terminal user. In addition, during an ongoing conversation between the terminal user and a call center employee, for example, a media file whose content is an announcement and/or hold music can be played to the telecommunication terminal user if the call is transferred and/or forwarded. Also, in addition to an ongoing conversation between the telecommunication terminal user and the user of another telecommunication terminal, the media file can also be played to the telecommunication terminal user in the form of a video from his conversation partner, for example.

Advantageously, a piece of information assignable to the user, which is in the telecommunication system before the media file is called up, is used to determine the user's location, wherein the media file is called up depending upon the determined location of the user, by choosing a link assigned to the determined location. The information assignable to the user can be, for example, a telephone number or IP address. The user's location can be in the form of an address, also called a street address or "civic address," in the form of latitude and longitude information, such as a GPS signal, or in another form. By choosing the link assigned to the user's determined location, the media file is selected depending on the caller's location. A favorable feature with respect to a customer of a company, who contacts the company's telecommunication system as the user of a terminal, is to determine the user's location based on his telephone number and play a live stream from a local radio station to the user. In this case, the information assignable to the user is the telephone number, and the media file is called up as a live stream from a local radio station according to the determined location of the user and is played to the user.

When the information assignable to the user is a telephone number, this information can be transferred from the telecommunication terminal to the telecommunication control unit, by means of CLIP (Calling Line Identification Presentation, or caller ID), for example, when the user uses the telecommunication terminal. Alternatively, the information assignable to the user can be transferred to the telecommunication control unit before and/or after the user uses the telecommunication terminal, e.g., independently of the user's use of the telecommunication terminal.

According to embodiments of the invention, a presence server may be connected to the telecommunication control unit, wherein the information assignable to the user is transferred from the telecommunication control unit or from the telecommunication terminal to the presence server, the information assignable to the user is used by the presence server to determine the user's location, and a piece of information about the determined location is transferred from the presence server to the telecommunication control unit. The presence server can be a standalone unit or can be integrated into the telecommunication control unit. In addition to transferring information about the user's determined location to the telecommunication control unit, the presence server can provide location information to other units. For example, the presence server can determine the residence location of an employee or the residence locations of multiple employees of the company that operates the telecommunication system, in areas of the company with higher security levels, for example. The presence server can receive information assignable to the user transferred directly from the user's telecommunication terminal, avoiding the detour of having to transfer this information from the telecommunication terminal through the telecommunication control unit to the presence server.

By determining the location of the telecommunication system user and calling up the media file dependent upon the determined location of the user by selecting a link assigned to the determined location, it is possible for a called-up live stream from a local radio station to be played to a telecommunication terminal user depending on the user's determined location, based on his telephone number as the information assignable to the user. For example, a caller from Munich hears a Bavarian radio broadcast, while a caller from Cologne hears local news from the WDR (West German broadcast service). Alternatively or additionally, the location-dependent media file selection can be such that advertising messages from companies in or near the telecommunication terminal user's location are used as the content of the media file played to the user. Embodiments of the invention may therefore permit user-specific addressing of content that is to be presented to the user unrequested, for example as a user-specific platform for advertising messages from third-party advertisers.

The media file can be stored on a media server outside of the telecommunication system, connected to the telecommunication control unit via the interface. The media server can be the Cloud on the Internet or a server in a local area network (LAN) or a wide area network (WAN). In principle, any type of server that can be connected to the telecommunication system via the interface in the telecommunication control unit is suitable for executing the invented method.

The link can be configured in the telecommunication control unit as a link, in particular a URL (Uniform Resource Locator), or as a network path. A URL, acting as a "uniform resource locator," identifies and locates a resource, such as a website, by means of the access method applied, such as the network protocol in use, e.g., HTTP (Hypertext Transfer Protocol) or FTP (File Transfer Protocol) and the location of the resource in computer networks. Placing links to the media file in the telecommunication control unit eliminates the need to store the media file locally in the telecommunication control unit. With this invention, in addition to placing links to media files stored outside of the telecommunication system, it is also possible to store other media files locally on the telecommunication control unit. This allows for the mixed use of media files whose content is to be presented unrequested to the user of a telecommunication terminal in the telecommunication system, wherein locally stored as well as externally stored media files are called up by the telecommunication control unit.

A trunk can be assigned as the main line between the telecommunication control unit and the telecommunication terminal and can be an ITSP (Internet Telephony Service Provider), ISDN (Integrated Services Digital Network), HKZ (main station identification code), SIP-Q, SIP (SIP: Session Initiation Protocol), or CorNet-NQ (CorNet Corporate Networking) type of trunk.

The media assignment target in the telecommunication control unit can be selected by using the SIP network protocol or MGCP (Media Gateway Control Protocol). The Media Gateway Control Protocol is a network protocol for controlling VoIP gateways (VoIP: Voice over IP). MGCP is a master-slave protocol that transfers control information in clear text, like SIP. Here, the VoIP gateway works as the slave and is controlled by a transmission unit such as the telecommunication control unit.

The telecommunication system can be connected to another telecommunication system, wherein the media assignment target in the telecommunication control unit is configured centrally for the telecommunication system and the other telecommunication system for assigning media files stored outside of the telecommunication systems. By assigning media files through the media assignment target centrally for the telecommunication system and/or the other telecommunication system, announcements and other content that is to be presented unrequested is managed centrally for one or more locations. This allows each telecommunication terminal connected to the telecommunication system and/or to the other telecommunication system to manage announcements. Announcements and other content to be presented unrequested can also be managed outside of a switch configuration or outside of the company network. The central administration of announcements and other content to be presented unrequested for one telecommunication system and/or another telecommunication system can reduce administrative costs. As needed, the administration of announcements and other content to be presented unrequested can be transferred to an internal or external service provider for the company that operates the telecommunication system and/or the other telecommunication system.

The link to the media file stored outside of the telecommunication system can be placed in the telecommunication control unit for multiple telecommunication terminals. Alternatively or additionally, the media file to be presented unrequested at a certain point in time can be assigned by placing multiple links to various different media files in the telecommunication control unit. For example, for a single telecommunication terminal, media files for several different locations can be assigned by means of different links in the telecommunication control unit. Also, with the placement of one link, multiple telecommunication terminals can access the various media files, depending on the location of a user of one of the terminals in the telecommunication system. Different links to different media files with the same content provides increased insurance in the event that one of the links fails. Because multiple telecommunication systems can access the media assignment target in the network connection or locally by means of link placement, a centralized device for one or more telecommunication systems, with a supply of announcements and other content to be presented unrequested, is therefore possible. To do this, the media assignment target can be selected in the telecommunication control unit using an internal control unit or an external control unit, in particular a CTI (Computer Telephony Integration) control unit. A control unit that acts on one or more telecommunication terminals and/or on the telecommunication control unit is suitable for the internal control unit. CTI is a telecommunication linkage with electronic data processing, wherein CTI allows computer programs to automatically initiate or terminate telephone calls, set up telephone conferences, send and receive fax transmissions, provide telephone directory services, and forward calls.

Embodiments of the invention further pertains to a computer program product for executing the invented method. The computer program product can be a diskette, a DVD (Digital Versatile Disc), a CD (Compact Disc), a memory stick, or another non-transitory storage medium that is readable by a computer device and has instructions that define a method that is performed when the program is executed by that device. The computer program product can be installed on a server or other computer device such as a server or computer device that includes a telecommunication control unit or is configured as a telecommunication control unit.

Embodiments of the invention further concerns a telecommunication system that comprises a telecommunication control unit and multiple telecommunication terminals connected to the telecommunication control unit, for calling up a media file, wherein the content of the called up media file can be presented unrequested to a user of the telecommunication terminal via a connection established with one of the multiple telecommunication terminals. The telecommunication system comprises an interface in the telecommunication control unit, which is configured such that the media file stored outside of the telecommunication system can be accessed via the interface. The telecommunication system further comprises a media assignment target unit, which is configured such that each of the multiple telecommunication terminals can select a media assignment target that is installed in the telecommunication control unit centrally for the telecommunication system in such a way that the media file is assignable, wherein the telecommunication control unit is configured such that, if the media assignment target is selected through one of the multiple telecommunication terminals, a link to the media file can be placed in the telecommunication control unit, whereby the media file can be assigned, and the telecommunication control unit can call up the media file via the interface, using the link placed in the telecommunication control unit. The media assignment target unit can be a Realtime Transport Protocol (RTP) source. The advantages, effects, and embodiments of the invented method apply correspondingly to the invented telecommunication system. Accordingly, announcements and other content to be presented unrequested can be managed centrally for one or more locations with the invented telecommunication system. In addition, announcements and other content to be presented unrequested can be managed outside of the switch configuration or company network. One or more telecommunication systems that are local or are in the network connection can access media files stored outside the one or more telecommunication systems through the same media assignment target unit, allowing for centralized processing and management of announcements and other content to be presented unrequested for the one or more telecommunication systems.

Other details, objects, and advantages of the invention will become apparent as the following description of certain exemplary embodiments thereof and certain exemplary methods of practicing the same proceeds.

BRIEF DESCRIPTION OF THE DRAWINGS

Exemplary embodiments of the invention and also advantages of these embodiments will be explained below with reference to the figures. Unless specifically stated otherwise, the same reference numbers in the figures denote the same components with the same meaning. The figures show.

DETAILED DESCRIPTION OF EXEMPLARY EMBODIMENTS

Figure 1A:
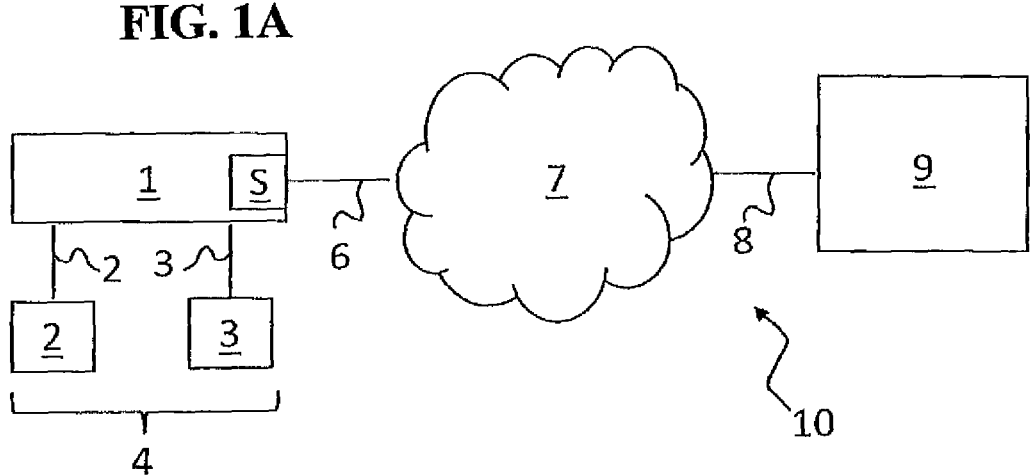
FIGS. 1A to 1C: block diagrams illustrating exemplary embodiments of a telecommunication system with an assigned media server outside of the telecommunication system.

FIG. 1A shows a first embodiment of the invented telecommunication system. A telecommunication control unit 1 comprises an interface S, via which a media file (not shown) stored on a media server 9 outside of the telecommunication system 4 can be accessed. According to the arrangement 10 shown in FIG. 1A, the media server 9 is connected via the connection 6, the network 7 and the connection 8 to the interface S of the telecommunication control unit 1. The telecommunication system 4 comprises, in addition to the telecommunication control unit 1, two terminals 2, 3, wherein the telecommunication terminal 2 and the telecommunication terminal 3 are connected via the connections 2' and 3' respectively to the telecommunication control unit 1. The media server 9 can be configured as part of an Internet Cloud or as a local server in a LAN/WAN. The telecommunication control unit can be configured as OpenScape Office MX or OpenScape Office LX, for example. The connections 2', 3', 6, 8 can be wired as fixed network connections or can be wireless connections. Mixes of wired and wireless connections are possible. In the telecommunication control unit, a media assignment target (not shown) selectable by each of the telecommunication terminals 2, 3 is established centrally to the telecommunication system 4 for assigning the media file. The media assignment target is selected through one of the telecommunication terminals 2, 3, and a link (not shown) to the media file is placed in the telecommunication control unit 1, thereby assigning the media file. The media file is then called up by the telecommunication control unit 1 via the interface S, using the link placed in the telecommunication control unit 1. The link can be placed in the communication control unit 1 as a URL in the media assignment target, wherein the URL accesses the media file located on the media server 9 via the connection 6, the network 7, and the connection 8. For presentation of the media file's content, the media file on the media server 9 is called up from the media server 9 by the telecommunication control unit 1, via the connection 6, the network 7, and the connection 8, and is transmitted via the connection 2' to the telecommunication terminal 2 and/or via the connection 3' to the telecommunication terminal 3. The media file's content is presented unrequested to a user of the telecommunication terminal 2 and/or a user of the telecommunication terminal 3 by means of calling up the media file from the media server 9. At the time when the media file is called up from the media server 9, the connection 2' and/or the connection 3' from the telecommunication terminal 2 and/or the telecommunication terminal 3 to the telecommunication control unit 1 is established. The telecommunication terminals can be OpenStage terminals from Siemens Enterprise Communications GmbH & Co. KG, for example. Another terminal, such as a mobile telephone, IP telephone, or other terminal connected with wires or wirelessly to the telecommunication control unit is alternatively or additionally possible. The media server 9 can be an audio server, video server, or combination audio/video server.

Figure 1B:
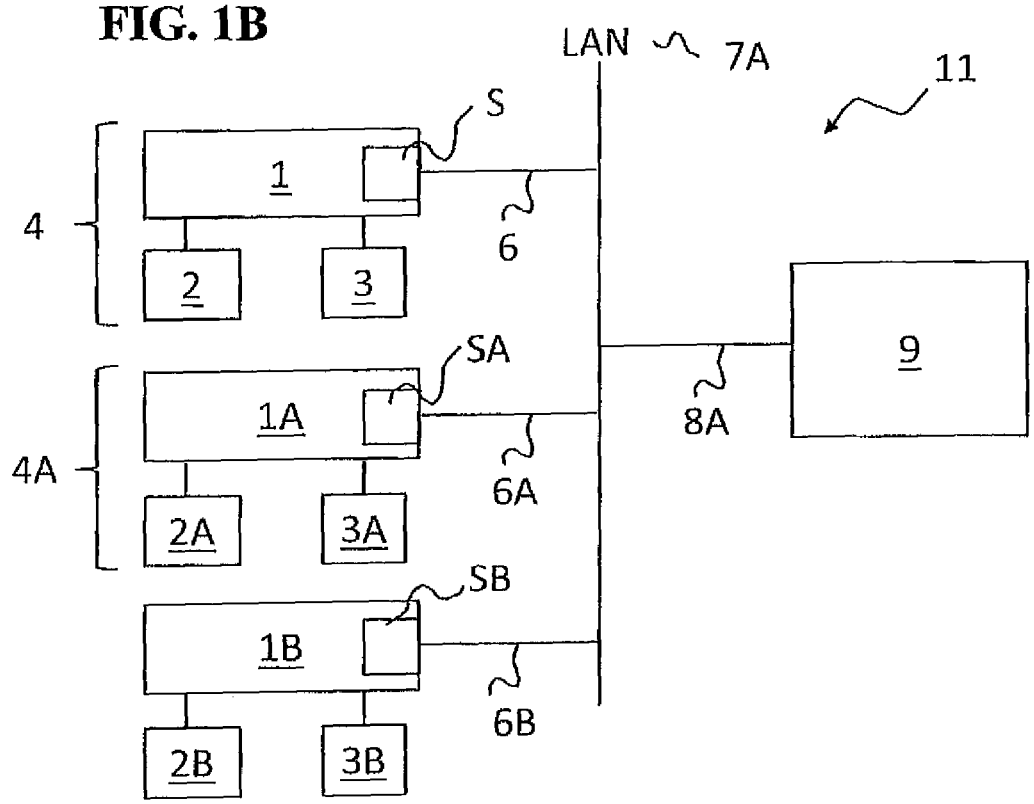

FIG. 1B shows an embodiment of the invention with multiple telecommunication systems 4, 4A in a facility connection, wherein the telecommunication systems 4, 4A are connected to a central media server 9. In contrast to arrangement 10 with the telecommunication system 4 and the media server 9, FIG. 1B shows a facility connection with multiple telecommunication systems 4, 4A, each of which is connected to the media server 9 via a LAN 7A. The telecommunication system 4 is connected to the media server 9 via the interface S, the connection 6', the LAN 7A, and the connection 8A. In addition, the telecommunication system 4A, in which a telecommunication control unit 1A with an interface SA is connected to the terminals 2A, 3A, is connected to the LAN 7A via the connection 6A. Like the telecommunication system 4, the telecommunication system 4A is connected to the media server 9 via the connection 6A, the LAN 7A, and the connection 8A. Additional telecommunication systems can be connected to the media server 9 via the LAN 7A and the connection 8A. The arrangement 11 in FIG. 1B, for example, shows the example of an additional telecommunication system comprising a telecommunication control unit 1B with an interface SB and terminals 2B, 3B that are connected to the telecommunication control unit 1B. This telecommunication system is connected to the LAN 7A via the connection 6B. The media server 9 is configured as an audio server, wherein each telecommunication system 4, 4A receives the same audio stream, which is stored as a media file on the audio server 9, whenever the content of the audio stream is supposed to be presented unrequested to a user of the telecommunication terminals 2, 3, 2A, 3A, 2B, 3B. Instead of an audio stream, a video stream can also be called up by the telecommunication control unit 1, 1A, 1B from the media server 9 via the connection 8A and the LAN 7A, via a link which can be in the form of a URL, for example. Streams can designate audio and/or video files that are received from a computer network and simultaneously forwarded. The data transfer process itself is called streaming, and both the file and the content of the stream are designated as a livestream or stream.

Figures 1C, 2:
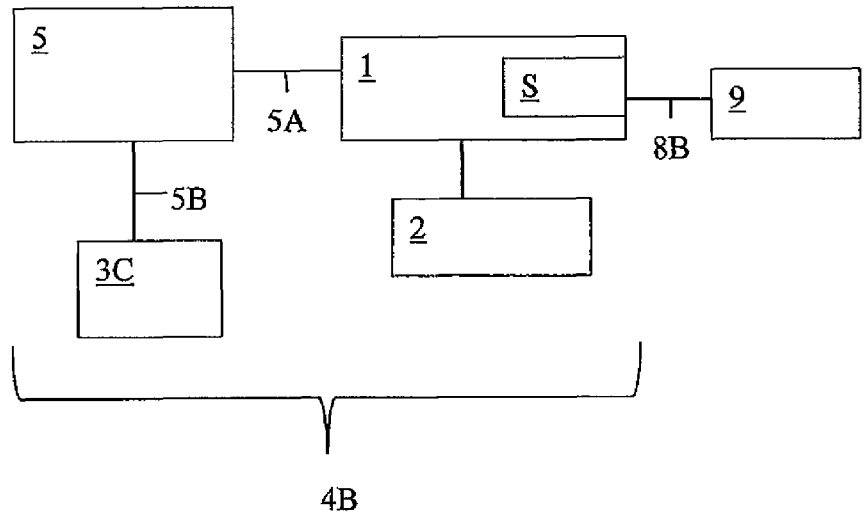
FIG. 2: a block diagram illustrating a graphic user interface illustrating a media assignment target in which multiple links to various respective media files are placed.

In FIG. 1C, as an additional embodiment of the invention, an arrangement 12 of a telecommunication system 4B and a media server 9 is shown, wherein the media server is connected to the telecommunication system 4B via a connection 8B. The telecommunication system 4B comprises the telecommunication control unit 1 with the interface S, via which the connection 8B to the media server 9 is established. A terminal 2 is connected directly to the telecommunication control unit 1. Also connected to the telecommunication control unit 1 are the trunk 5, also called CO (Central Office), via the connection 5A, and the other telecommunication terminal 3C, via connection 5B. The telecommunication system 4B therefore comprises a trunk line consisting of the connection 5A, the trunk 5, and the line 5B. The trunk lines 5A, 5, 5B can also be designated as a trunk. Telecommunication terminals 2, 3C can be connected to the telecommunication control unit via one or more trunks. It is also possible for the telecommunication control unit 1 to be connected exclusively via trunks to the telecommunication terminals 2, 3C. Combinations of local and trunk connections are possible. In the arrangement 12 shown in FIG. 1C, a user of the telecommunication terminal 2, which is connected directly to the telecommunication control unit 1, is an internal user/caller. In contrast, a user of terminal 3C, which is connected to the telecommunication control unit 1 via the trunk line 5B, 5, 5A, is an external user/caller. In spite of the "external" designation for the user of the terminal 3C, the telecommunication system 4B comprises both the telecommunication terminal 3C and the telecommunication terminal 2. The media server 9, which is connected to the telecommunication control unit 1 via the connection 8B, is not part of the telecommunication system 4B. In order to be part of the telecommunication system 4B, the media server 9 would have to be configured as a telecommunication terminal 2, 3C. This is not done with media servers, because a real-time duplex telecommunication connection to the communication control unit 1 cannot be established through a media server. Instead, the media server 9 remains available as a storage location and source of media files for the telecommunication control unit 1, which can access a media file stored on the media server 9 via a connection. If the media file is stored in the telecommunication control unit 1 and/or in the telecommunication terminals 2, 3C, the media file is local to the telecommunication system 4B and is not stored outside of the telecommunication system 4B.

FIG. 2 shows a graphic user interface 20 that includes the media assignment target 21 in the form of the "connection settings" concept. The media assignment target 21 comprises the menu 22, from which an announcement and/or internal hold music can be selected centrally to the telecommunication control system 4, 4A, 4B from any of the multiple telecommunication terminals 2, 2A, 2B, 3, 3A to 3C for assigning a media file. In this embodiment, links 27A to 27E for various announcements 23 are shown to the viewer of the graphic user interface 20. In addition to the menu for announcements 23, another menu can be called up, e.g., for assigning an entry door speaker (not shown) via the media assignment target 21. The menu for announcements 23 comprises the sub-menu 24, through which an announcement and/or hold music can be changed. An announcement 25 or hold music entry here comprises a number 26, an audio file 27, and a description 28. Instead of an audio file 27, a video file (not shown) can be used as the announcement and/or hold music. A first announcement 26A comprises a WAV audio file, which is played in an endless loop, 28A, as the conference tone for a conference call. A second announcement 26B comprises a callback tone in the form of a WAV file, which unlike the announcement 26A is not played endlessly, but instead using a Start and Stop function, 28B. The announcements 26A and 26B can be stored locally on the telecommunication system 4, 4A, 4B or can be stored outside of the telecommunication system 4, 4A, 4B on the media server 9. In addition to the links 27A and 27B to the corresponding file, a link 27C to an announcement file is shown in another announcement 26C. The announcement file can be called up from the Internet as link 28C. Another type of link is used for the announcement 26B. Its link 27D goes to a file stored locally on a server, which can also be called up from a local server if the Internet goes down. Like the announcement file for the announcement 26C, the "default" file is also designated as link 28D. Another announcement 26E comprises a link 27E to a live stream of the West German broadcast service (WDR). This link can be called up from the Internet as a URL, and it can be called up in particular when the user of a telecommunication terminal in the telecommunication system 4, 4A, 4B reports being in a location that is within the transmission range of the West German broadcast service. In this case, a piece of information assignable to the user, such as a telephone number, is transmitted from the terminal to the telecommunication control unit 1, 1A, 1B, and the link 27E is called up by the telecommunication control unit 1, 1A, 1B, and the media file linked to the link 27E is transferred from the media server 9 to the user's terminal, if the telecommunication control unit 1 determines that the user's location lies within the transmission range of the West German broadcast service. In the embodiment shown in FIG. 2, using the link 27E calls up the transmitter "WDR2" from the media server 9 as link 28E. Instead of a URL 27C, 27D, 27E, a network path, in the form of an IP address, for example, can be used to call up the media file.

Figure 3:
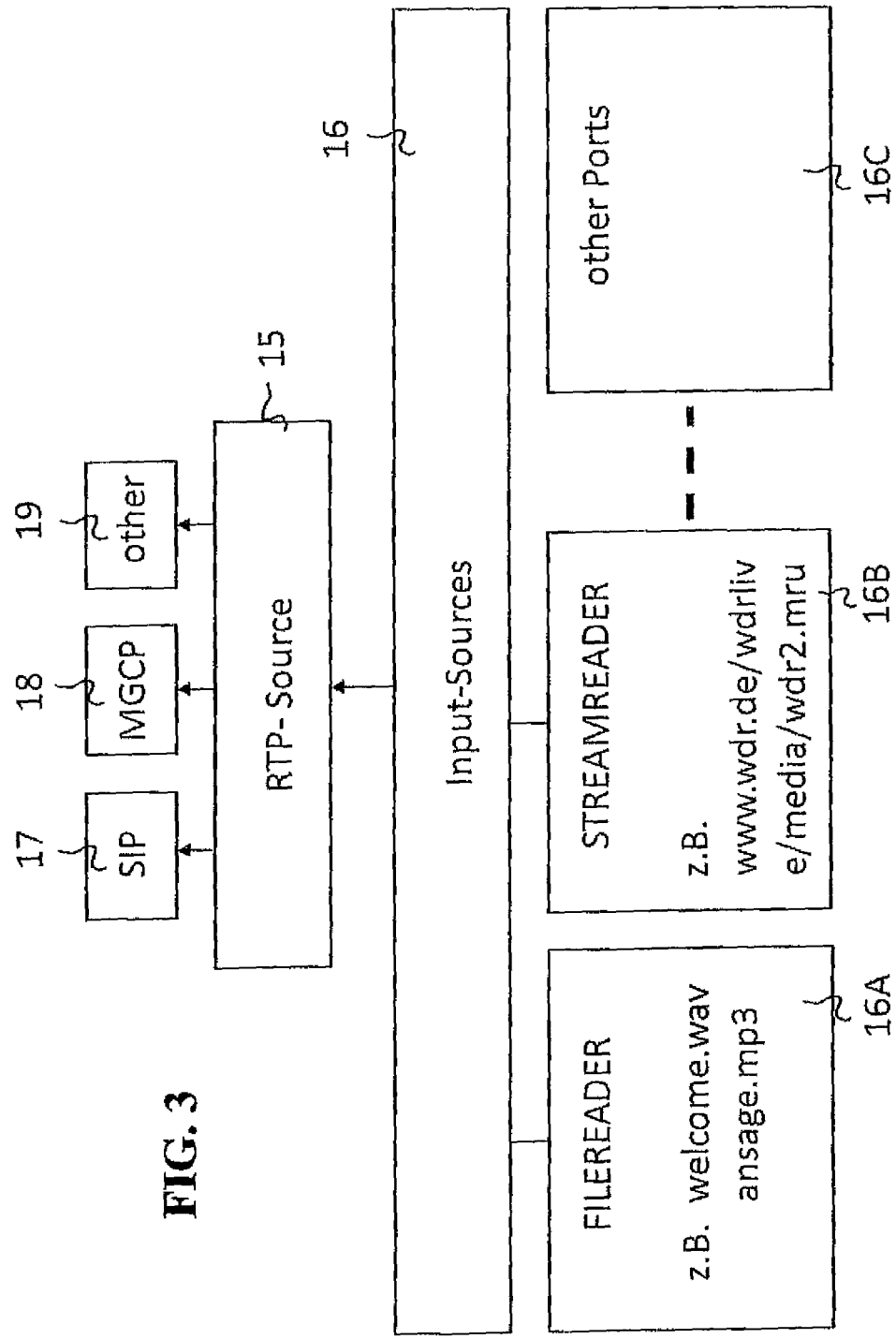
FIG. 3: a schematic representation of the media assignment target unit in an embodiment as an RTP source with various input sources.

FIG. 3 shows an arrangement consisting of a media assignment target unit 15 in the form of an RTP source with assigned input sources 16. The media assignment target unit comprises, as the source, a Realtime Transport Protocol source (RTP source) 15, wherein RTP is a protocol for continuous transfer of audiovisual data, in particular streams, over IP-based networks. The input sources 16 can be a filereader 16A, a streamreader 16B, or sources at other ports 16C. The filereader 16A can play announcements in WAV format and/or MP3 format. The streamreader 16B plays the announcement 26E from the link 27E, shown in FIG. 2, for example. The media assignment target in the media assignment target unit 15 is selected using the network protocol SIP, 17, MGCP, 18, or another protocol 19. The selection can be made via a telecommunication terminal configured as an SIP/HFA or TDM terminal. In addition to the open standard for SIP voice communication, HFA is also known as the manufacturer-specific protocol of Siemens Enterprise Communications GmbH & Co. KG. If there is a trunk between a telecommunication terminal and the telecommunication control unit 1, 1A, 1B, it can be an ITSP, ISDN, HKZ, SIP-Q, SIP, or CorNet-NQ trunk. An Internet Telephony Service Provider (ITSP) connects the Internet to a regular telephone network through a gateway. The SIP-Q protocol refers to SIP signaling using the QSIG protocol, wherein QSIG is an ISDN-based signaling product used in telecommunication for networking telephone systems. SIP-Q uses Lotus Sametime Unified Telephony CorNet-NQ extensions and is used to link different systems that are not supported by SIP signaling. CorNet, with the protocol variation CorNet-NQ, is an ISDN network protocol developed by Siemens for telephone systems. In contrast to the QSIG protocol, CorNet integrates all manufacturer-specific features. Nonetheless, QSIG may be used for end-to-end signaling, because QSIG allows for complete tunneling of the CorNet protocol. In contrast, HKZ designates a main station identification code as the designation for the signaling process on analog telephone lines in the German telephone network. In HKZ, the impulse selection process and the multi-frequency selection process are used as the selection processes.

Figure 4:
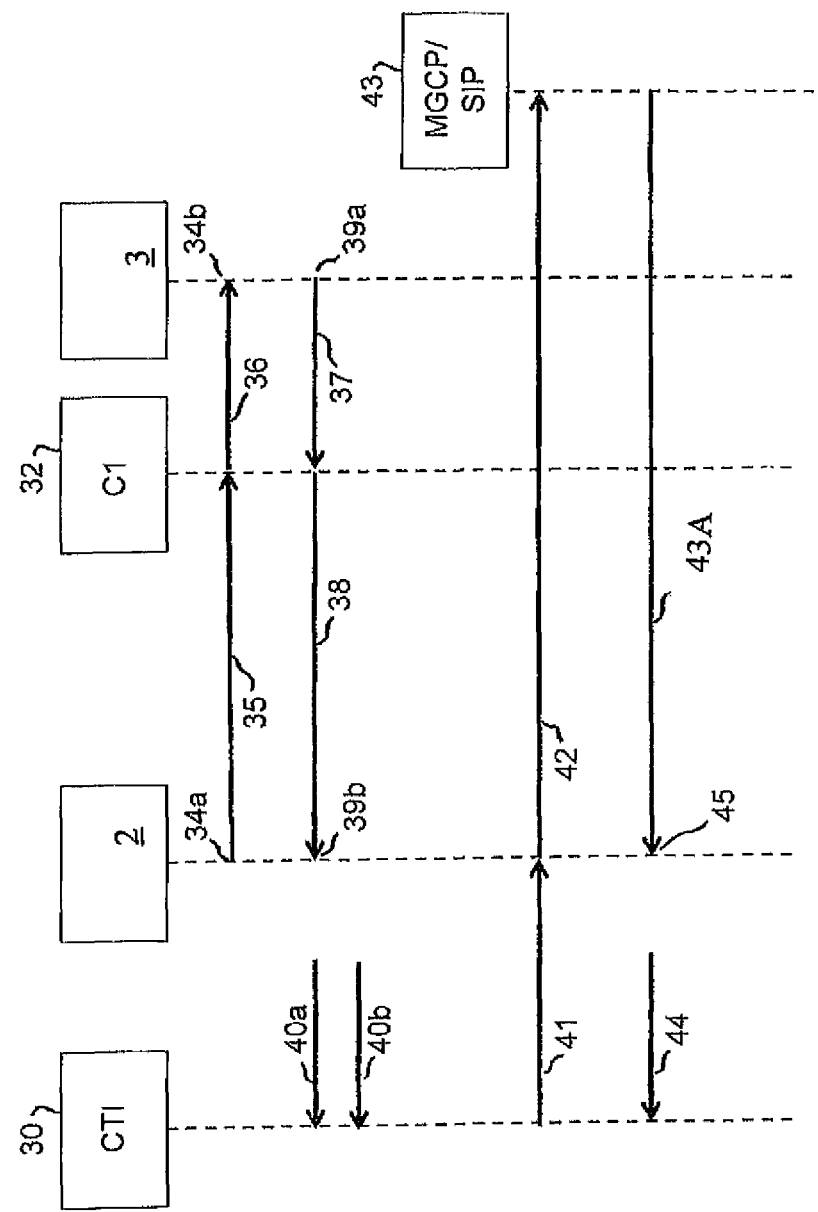
FIG. 4: a flow diagram for calling up the media file in an embodiment of the telecommunication system.

FIG. 4 shows a flow diagram for calling up a media file with the content of an announcement 45 according to an embodiment of our method. The telecommunication terminal 2, which alternatively can also be configured as a trunk, and the telecommunication terminal 3, which can be configured as a UCD terminal (UCD: Uniform Call Distribution), are both in idle status, 34A, 34B. The UCD feature allows an incoming internal or external call to be assigned automatically to the terminal of a participant in a UCD group (agent) that has been idle for the longest time. If all of the participants' terminals in a UCD group are busy, the additional incoming calls are placed on hold and distributed to the terminals of group participants depending on priority and wait time. UCD terminals can be operated as part of ACD (Automatic Call Distribution) arrangements with the HiPath 3000 or OpenScape Office telephone systems from Siemens Enterprise Communications GmbH & Co. KG with the UCD feature. Callers who are placed in a waiting queue can have announcements or music played to them. With the next reservation request 35 through the terminal 2, the terminal 3 is activated, 36. The terminal 2 and the terminal 3 acknowledge this reservation request, 37, 38, and therefore switch to call status, 39a, 39b. A possible alternative to call status is switching to waiting queue status. This switch is reported to the CTI control unit 30, as it occurs, 40a, 40b. The conversation between the user on terminal 2 and the other user on terminal 3 is carried out over the connection C1, 32. Next the infeed of an announcement is requested, 41, by the CTI control unit. This announcement should be available as a media file. The request 42 is forwarded through the MGCP authority 43 to the RTP source (see FIG. 3). Alternatively, the request 42 can be forwarded through an SIP authority to the RTP source. When the connection 42 is processed, the call-up location of the media file is sent based on the corresponding link (not shown) in the telecommunication control unit 1, 1A, 1B. The successful completion 43A is reported, 44, to both the terminal 2 and the CTI control unit 30. The user of the terminal 2 then hears the content of the media file in the form of the announcement 45.

Figure 5:
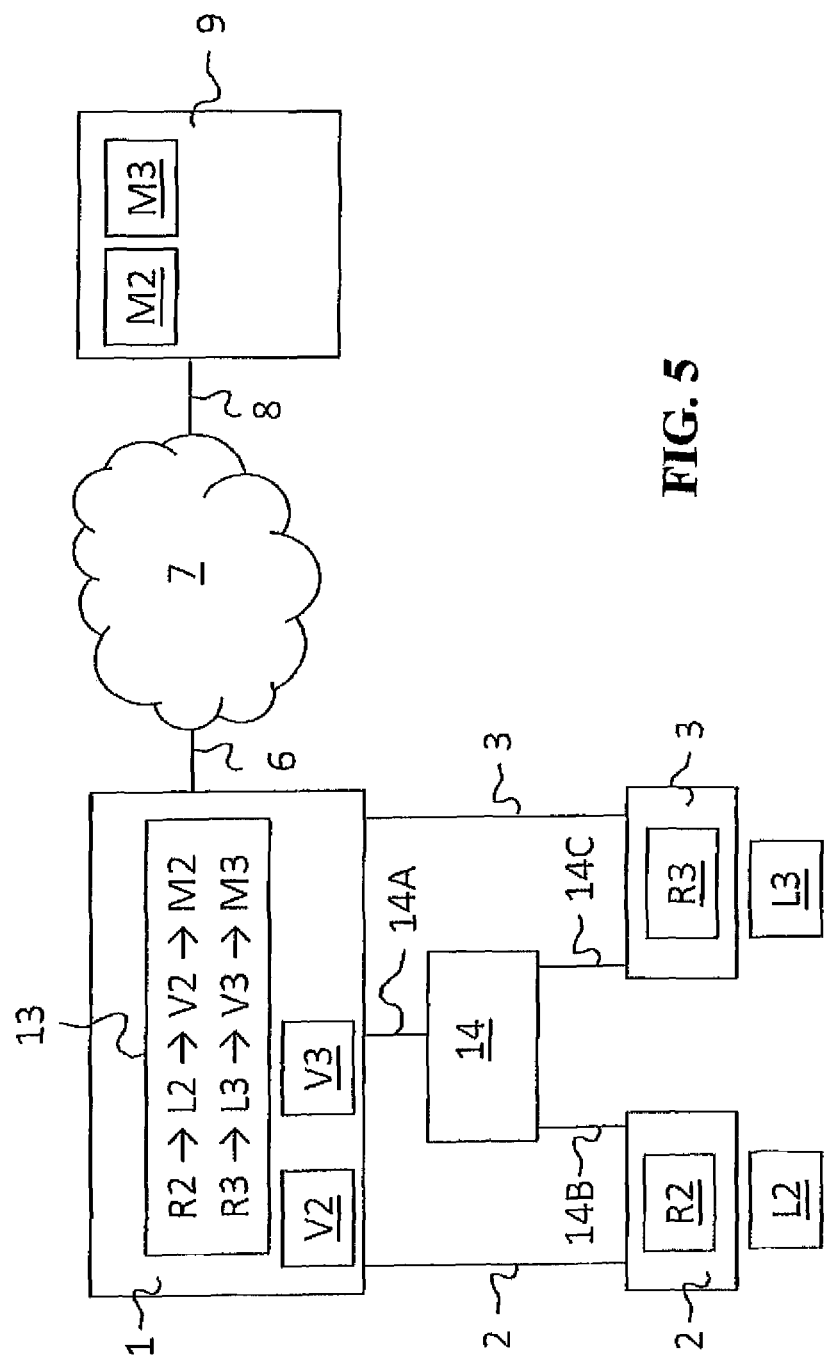
FIG. 5: an arrangement according to the invention of a telecommunication system with an assigned media server and a presence server outside of the telecommunication system.

FIG. 5 shows the invented telecommunication system with an external media server 9 and a presence server 14. In the telecommunication control unit 1, which is connected to the external media server 9 via the connection 6, the network 7, and the connection 8, there are links V2, V3 to the media files M2, M3, with the link V2 leading to the media file M2 and the link V3 leading to the media file M3, wherein the media files M2, M3 are located on the media server 9. The telecommunication terminal 2 is connected to the telecommunication control unit 1 via the connection 2' and to a presence server 14 via the connection 14B. The telecommunication terminal 3 is connected via the connection 3' to the telecommunication control unit 1 and via the connection 14C to the presence server 14, which in turn is connected via a connection 14A to the telecommunication control unit 1. Information assignable to the user in the form of a telephone number R2 is located on the terminal 2. Information assignable to the user in the form of a telephone number R3 is located on the terminal 3. Before the media file M2, M3 is called up, the information assignable to the user R2, R3 is therefore present in the telecommunication system that comprises the terminals 2, 3. The information assignable to the user R2 and/or R3 is used to determine the location L2 of the terminal 2, and thereby also of the user of the terminal 2, and/or the location L3 of the terminal 3, and thereby also of the user of the terminal 3. To do this, the information R2 assignable to the user of the terminal 2 is transmitted via the connection 14B from the terminal 2 to the presence server 14. The information R3 assignable to the user of the terminal 3 is transmitted via the connection 14C from the terminal 3 to the presence server 14.

As an alternative to the direct transmission of the information assignable to the user R2, R3 via the connection 14B and/or 14C, this information assignable to the user can be transmitted via the connection 2' or 3' from the telecommunication control unit 1 via the connection 14A to the presence server 14. The embodiment shown in FIG. 5, with connections to the presence server as well as from the telecommunication control unit 1, 14A and from the terminals 2, 3 in the form of the connections 14B, 14C, provides redundancy in transmitting the information assignable to the user, so that if the direct connections between the terminals 2, 3 and the presence server 14 fail, or if the connection 14A from the telecommunication control unit to the presence server 14 fails, the telecommunication control unit 1 or the terminals 2, 3 can still reach the presence server. The presence server 14 determines the locations L2, L3 of the users of the terminals 2, 3 from the information R2, R3 assignable to the users and forwards the determined locations L2, L3 to the telecommunication control unit 1. Using the determined locations L2, L3, the telecommunication control unit selects, for the terminal 2 and the terminal 3 separately, based on the determined location L2, L3, a link V2 for the terminal L2 and a link V3 for the terminal L3. If the content of a media file is supposed to be presented unrequested to the user of the terminal 2, the telecommunication control unit 1 calls up the media file M2 from the media server 9 using the link L2 and forwards the media file M2 via the connection 2' to the terminal 2 so that the content of the media file M2 can be played on the terminal 2. The telecommunication control unit 1 then calls up the media file M3 from the media server 9 via the link V3 and forwards the media file M3 via the connection 3' to the terminal 3 so that the content of the media file M3 can be played. If either of the connections 2' or 3' fails, the telecommunication control unit 1 can send the media file M2 and/or the media file M3 via the connection 14A, the presence server 14, and the connection 14B and/or 14C to the terminal 2 and/or the terminal 3.

The media file M2 and/or the media file M3 is transmitted to the terminal 2 and/or the terminal 3 by the telecommunication control unit 1 at the point when the telecommunication control unit determines that the content of a media file should be presented unrequested to the user of the terminal 2 and/or the terminal 3. The media files can be audio streams and/or audio files, which can be located on a media server 9 or on multiple external servers. The servers outside of the telecommunication system can be local in a company network or can be part of the Internet. In another embodiment, the link V2, V3, which can be configured as a URL or as a network path, can be used to send customer-specific parameters, such as regional settings like the language spoken by the user of the terminal 2 and/or 3 or local offerings from the service provider operating the telecommunication system that comprises the telecommunication control unit 1 and the terminals 2, 3.

With respect to the features of the embodiments shown in FIGS. 1-5, they can exist in other embodiments. For instance, a presence server 14 may be included in any of the arrangements illustrated in FIGS. 1a to 1c.

It should be understood that embodiments of the system, method and other apparatuses media file content that is tailored individually to a user's needs can automatically be presented unrequested to the user of a telecommunication terminal in the telecommunication system. While certain present preferred embodiments of a communication terminal, non-transitory computer readable medium executable by a communication device such as a telecommunication control unit, a communication system, and methods of making and using the same have been shown and described above, it is to be distinctly understood that the invention is not limited thereto but may be otherwise variously embodied and practiced within the scope of the following claims.

What is claimed is:

1. A method for calling up a media file via a telecommunication system, the telecommunication system comprising a telecommunication control unit that is communicatively connected to a computer device external to a network in which the telecommunication control unit is connected, the method comprising:
   storing, by the telecommunication control unit, a media assignment target that is selectable for any of a plurality of communication terminals within the network of the telecommunication control unit for assigning a media file associated with the media assignment target;
   selecting the media assignment target;
   including at least one link to at least one media file in the telecommunication control unit in response to the selecting of the media assignment target;
   calling up a first media file from the computer device by the telecommunication control unit via an interface of the telecommunication control unit that connects the telecommunication control unit to the computer device, the calling up of the first media file by the telecommunication control unit using one of the at least one link included in the telecommunication control unit; and
   sending, by the telecommunication control unit, the called up first media file to a presence server that is outside the telecommunication control unit via a first communication connection for transmission of that called up first media file from the presence server to a first communication terminal via a second communication connection the presence server has with the first communication terminal such that the first media file is transmittable to the first communication terminal without the first communication terminal requesting a media file so that the first media file is playable on the first communication terminal to deliver content of that first media file via the playing of that first media file on the first communication terminal;
   wherein the telecommunication control unit is communicatively connectable to the presence server via the first communication connection and the telecommunication control unit is communicatively connectable to the first communication terminal via a third communication connection; and
   wherein the presence server is communicatively connected to the first communication terminal via the second communication connection.

2. The method of claim 1 wherein the calling up of the first media file by the telecommunication control unit using one of the at least one link placed in the telecommunication control unit occurs such that data of the first media file is transferred to the first communication terminal so that media of that first media file is output via the first communication terminal playing the first media file.

3. The method of claim 1 wherein the media file is an audio file, a video file, an audio stream or a video stream.

4. The method of claim 1 wherein the at least one link comprises a link to a livestream of an internet transmitter that transmits media content.

5. The method of claim 1 wherein the at least one link is comprised of a first link and a second link, the first link associated with the first media file and the second link associated with a second media file, the method further comprising:
   before the calling up of the first media file, the telecommunication control unit determining a location of a first user of the first communication terminal at which media of the first media file is to be emitted;

upon determining the location of the first user as being a first location associated with the first media file, the telecommunication control unit selecting the first link for forwarding the first media file to the first communication terminal so media of the first media file is output by the first communication terminal at the first location via the first communication terminal playing the first media file;

before the calling up of the second media file, the telecommunication control unit determining a location of a second user of the second communication terminal at which media of the second media file is to be emitted;

upon determining the location of the second user as being a second location associated with the second media file, the telecommunication control unit selecting the second link for forwarding the second media file to the second communication terminal so that media of the second media file is output at the second location by the second communication terminal playing the second media file.

6. The method of claim 5 wherein the telecommunication control unit determining the location of the first user comprises communicating, by the telecommunication control unit, with the presence server via the first communication connection to determine the location of the first user, the method further comprising:
the presence server evaluating information assignable to the first user to determine the location of the first user; and
the presence server sending information about the determined location of the first user to the telecommunication control unit via the first communication connection.

7. The method of claim 6 wherein the information assignable to the first user is a telephone number of the first communication terminal and the first media file is an audio file or a video file.

8. The method of claim 7 wherein the computer device is a media server that is outside of the network and wherein the first and second media files are stored in the media server.

9. The method of claim 1 wherein the at least one link is a uniform resource location or a network path.

10. The method of claim 1 comprising:
determining by the telecommunication control unit that the third connection between the first communication terminal and the telecommunication control unit has failed such that data is no longer communicable between the telecommunication control unit and the first communication terminal via the third connection;
in response to determining that the third connection has failed such that data is no longer communicable between the telecommunication control unit and the first communication terminal via the third connection, the telecommunication control unit performing the sending of the called up first media file to the presence server via the first communication connection to cause the first media file to be sent to the first communication terminal via the second communication connection between the presence server and the first communication terminal.

11. The method of claim 10 comprising:
saving, by the first communication terminal, at least a portion of the first media file received via the second communication connection between the presence server and the first communication terminal prior to the playing of that first media file.

12. A non-transitory computer readable medium having a computer program product stored thereon that has instructions that define a method that is executed by a telecommunication control unit when the computer program product is run by the telecommunication control unit, the method comprising:
the telecommunication control unit storing a media assignment target that is selectable for any of a plurality of communication terminals within a network of the telecommunication control unit for assigning a media file associated with the media assignment target;
the telecommunication control unit including at least one link to at least one media file in response to receiving a selection of the media assignment target;
calling up a first media file of the at least one media file from a computer device by the telecommunication control unit via an interface of the telecommunication control unit that connects the telecommunication control unit to the computer device; and
the telecommunication control unit sending the called up first media file to a presence server that is outside the telecommunication control unit for transmission of that called up first media file to a first communication terminal via a first communication connection formed between the presence server and the first communication terminal such that the first media file is transmittable to the first communication terminal via the presence server without the first communication terminal requesting a media file so that the first media file is playable on the first communication terminal to deliver content of that first media file via the playing of that first media file on the first communication terminal.

13. The non-transitory computer readable medium of claim 12 wherein the telecommunication control unit is a server and the computer device is located in a network that is external to a network to which the telecommunication control unit is connected and the presence server is connected to the telecommunication control unit via a second connection.

14. The non-transitory computer readable medium of claim 12 wherein the at least one link is comprised of a first link and a second link and the at least one media file is comprised of the first media file and a second media file, the first link associated with the first media file and the second link associated with the second media file, the method further comprising:
before the calling up of the first media file, the telecommunication control unit determining a location of a first user of the first communication terminal to which media of the first media file is to be emitted;
upon determining the location of the first user as being a first location associated with the first media file, the telecommunication control unit selecting the first link for forwarding the first media file to the first communication terminal so media of the first media file is output by the first communication terminal at the first location via the first communication terminal playing the first media file;
before calling up of the second media file, the telecommunication control unit determining a location of a second user of the second communication terminal to which media of the second media file is to be emitted;
upon determining the location of the second user as being a second location associated with the second media file, the telecommunication control unit selecting the second link for forwarding the second media file to the second communication terminal so that media of the second media file is output at the second location by the second communication terminal playing the second media file.

15. The non-transitory computer readable medium of claim 14 wherein the telecommunication control unit determining the location of the first user comprises the telecommunication control unit communicating with the presence server via a second communication connection between the presence server and the telecommunication control unit to determine the location of the first user.

16. The non-transitory computer readable medium of claim 15, the method further comprising:
upon determining that a third connection between the telecommunication control unit and the first communication terminal has failed such that data is no longer communicable between the telecommunication control unit and the first communication terminal via the third connection, the telecommunication control unit performing the sending of the called up first media file to the presence server via the second communication connection to cause the first media file to be sent to the first communication terminal via the first communication connection between the presence server and the first communication terminal.

17. A telecommunication system comprising:
a plurality of communication terminals, the communication terminals comprising a first terminal and a second terminal;
a telecommunication control unit communicatively connected to the terminals within a first network, the telecommunication control unit having an interface configured such that media of a first media file is presentable unrequested to a first user of the first terminal;
a computer device of a second network, the computer device having the first media file, the computer device communicatively connected to the telecommunication control unit via the interface of the telecommunication control unit such that media of the first media file is presentable to the first user;
a presence server outside of the telecommunication control unit that is communicatively connectable to the communication terminals and is communicatively connectable to the telecommunication control unit;
wherein a first media assignment target is installed in the telecommunication control unit for assigning the first media file such that a first link to the first media file stored in the computer device is placeable within the telecommunication control unit by which the first media file is assignable and by which the first media file is callable, and
the telecommunication control unit configured to send the called up first media file to a presence server via a first connection between the presence server and the telecommunication control unit for transmission of that called up first media file to the first terminal via a second connection between the presence server and the first terminal such that the first media file is transmittable to the first terminal without the first user requesting that first media file and without the first terminal requesting the first media file such that the first media file is playable by the first terminal to deliver content of the first media file to the first user.

18. The system of claim 17 wherein the computer device has a second media file and the second media file is selectable for assigning the second media file such that a second link to the second media file is placeable in the telecommunication control unit, and wherein:
the telecommunication control unit is configured to determine a location of the first user before the calling up of the first media file,
the telecommunication control unit is configured such that, upon determining the location of the first user as being a first location associated with the first media file, the telecommunication control unit selects the first link for calling up the first media file so the first media file is sent to the first terminal of the first user at the first location;
the telecommunication control unit configured to determine a location of a second user of the second communication terminal before the calling up of the second media file;
the telecommunication control unit configured such that, upon determining the location of the second user as being a second location associated with the second media file, the telecommunication control unit selects the second link for calling up the second media file so that the second media file is sent to the second terminal of the second user at the second location without the second terminal requesting the second media file and without the second user requesting the second media file.

19. The system of claim 17 wherein the telecommunication control unit is configured to communicate with the presence server to determine the location of the first user, the presence server configured to evaluate information assignable to the first user to determine the location of the first user and send information about the determined location of the first user to the telecommunication control unit.

20. The system of claim 17 wherein:
the telecommunication control unit is configured to communicate with the presence server to cause the first media file to be sent to the first terminal via the second connection between the presence server and the first terminal upon a detection of a failure of a third connection between the first terminal and the telecommunication control unit that prevents data from being communicable between the telecommunication control unit and the first communication terminal via the third connection;
the first terminal configured to save at least a portion of the first media file received via the second connection between the presence server and the first terminal prior to the playing of the first media file.

* * * * *